(12) United States Patent
Frees et al.

(10) Patent No.: US 7,251,100 B1
(45) Date of Patent: Jul. 31, 2007

(54) MOUNTING INTERFACE FOR A SPINDLE MOTOR

(75) Inventors: Gregory Michael Frees, Los Altos, CA (US); Andrew Keith Hanlon, San Jose, CA (US); Daniel Robert Stacer, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/191,577

(22) Filed: Nov. 13, 1998

(51) Int. Cl.
*G11B 17/02* (2006.01)

(52) U.S. Cl. .................................................. 360/99.08

(58) Field of Classification Search ............. 360/99.08; 310/51, 89, 99, 273; 248/592, 609, 613, 248/619
See application file for complete search history.

(56) References Cited

U.S. PATENT DOCUMENTS

| | | | | |
|---|---|---|---|---|
| 3,790,114 A | | 2/1974 | Italiano et al. ................. 248/13 |
| 3,941,339 A | * | 3/1976 | McCarty ....................... 248/15 |
| 4,584,928 A | * | 4/1986 | Haynes ......................... 92/161 |
| 4,648,579 A | * | 3/1987 | Wilson ......................... 248/638 |
| 4,806,811 A | * | 2/1989 | Mayumi et al. ............... 310/89 |
| 4,823,213 A | | 4/1989 | Naruki |
| 4,849,667 A | | 7/1989 | Morrill ......................... 310/91 |
| 5,040,764 A | * | 8/1991 | Dubois ......................... 248/635 |
| 5,081,551 A | | 1/1992 | Aruga ......................... 360/97.01 |
| 5,126,607 A | * | 6/1992 | Merriman, Jr. ............... 310/51 |
| 5,365,388 A | * | 11/1994 | Maughan et al. ........ 360/99.04 |
| 5,376,850 A | | 12/1994 | Elsing et al. ............. 310/67 R |
| 5,566,919 A | * | 10/1996 | Shephard ..................... 248/604 |
| 5,692,728 A | | 12/1997 | Shiozawa .................... 248/618 |
| 5,786,647 A | * | 7/1998 | Vollmer et al. ............... 310/89 |
| 5,796,707 A | | 8/1998 | Kim ........................... 369/219 |
| 5,804,776 A | | 9/1998 | Bizlewicz .................... 181/207 |
| 5,847,476 A | * | 12/1998 | Elsing et al. ................. 310/51 |
| 5,914,550 A | * | 6/1999 | Periyathamby et al. ........ 310/91 |
| 6,045,112 A | * | 4/2000 | Kirkwood .................... 248/634 |

FOREIGN PATENT DOCUMENTS

EP 0234661 2/1987

(Continued)

OTHER PUBLICATIONS

Document No. 05-44774, Unknown, JP.

*Primary Examiner*—Angel Castro
(74) *Attorney, Agent, or Firm*—David W. Lynch; Chambliss, Bahner & Stophel PC (57) ABSTRACT

A mounting interface for a spindle motor allows the optimization of the spindle dynamics. The mounting interface provides a steadfast relationship between a motor and a baseplate, wherein the mounting interface includes at least three surface points forming a single plane acting as a common boundary between the motor and the baseplate. The three surface points may be pads, and the pads may be coupled to the baseplate or to the mount flange. The three surface points provide reduced contact area between the mount flange and the baseplate, and the reduced contact area lowers the rigidity of the mount flange and the resonant frequencies. The surface area of the pads and the material of the pads is chosen to reduce acoustical noise. In addition, a damping ring may be provided for dissipating distortion energy between the motor, baseplate and/or mount flange.

21 Claims, 12 Drawing Sheets

FOREIGN PATENT DOCUMENTS

| | | |
|---|---|---|
| EP | 0847127 A1 | 9/1997 |
| EP | 847057 * | 6/1998 |
| GB | 2085635 A | 8/1981 |
| GB | 2185356 A | 1/1987 |
| GB | 2187325 A | 1/1987 |
| JP | 7169258 | 10/1993 |
| JP | 07169258 | 10/1993 |
| WO | PCT/GB99/03554 | 1/1999 |

* cited by examiner

MOUNTING INTERFACE FOR A SPINDLE MOTOR

BACKGROUND OF THE INVENTION

1. Field of the Invention

This invention relates in general to a spindle motors for disk drives, and more particularly to a mounting interface for a spindle motor.

2. Description of Related Art

Disk drive data storage devices are a popular medium for storing digital data. Disk drive data storage devices typically include at least one rotating disk, wherein digital data are written to and read from a thin layer of magnetizable material on the surface of the rotating disks. Write and read operations are performed through a transducer which is carried in a slider body. The slider and transducer are sometimes collectively referred to as a head, and typically a single head is associated with each disk surface. The heads are selectively moved under the control of electronic circuitry to any one of a plurality of circular, concentric data tracks on the disk surface by an actuator device. Each slider body includes a self-acting hydrodynamic air bearing surface. As the disk rotates, the disk drags air beneath the air bearing surface, which develops a lifting force that causes the slider to lift and fly several micro-inches above the disk surface.

In the current generation of disk drive products, the most commonly used type of actuator is a rotary moving coil actuator. The disks themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor.

More recently, personal computers have become more popular and are commonly located within the work space of the system user. This has prompted an increase in awareness of acoustic noise generated by the disk drives located within the personal computers. In certain markets, the amount of acoustic noise allowable in the work place is closely regulated. Accordingly, it has become common for system manufacturers to impose a "noise budget" on manufacturers of major system components, such as disk drives, which limits the amount of acoustic noise that such components can contribute to the overall noise of the system.

One of the principal sources of noise in disk drive data storage devices is the spindle motor which drives the disks at a constant speed. Typical spindle motor speeds have been in the range of 3600 RPM. Current technology has increased spindle motor speeds to 4800 RPM, 7200 RPM and above. Analysis of various types of disk drives has brought to light several different modes of acoustic noise generation which are attributable to the spindle motor and its control logic.

One mode of noise generation is sympathetic vibration of the disk drive housing in response to the rotating mass of the spindle motor. Another mode of acoustic noise generation is electromagnetic disturbances caused by the excitation of the stator mass by the application and removal of the commutation pulses that are used to drive the motor and control its speed. The commutation pulses are time, polarization-selected DC current pulses which are directed to sequentially selected stator windings. The rapid rise and fall times of these pulses act as a striking force and set up sympathetic vibrations in the stator structure.

Prior art attempts to reduce or eliminate noise include controlling the resonant frequency and damping vibrations. For example, in U.S. Pat. No. 5,376,850, acoustic noise is reduced by uncoupling the stator from hard contact with the stationary portion of the shaft. A plurality of O-rings interposed radially between the stator and the shaft of the spindle motor. Also, a non-metallic washer is positioned at one end of the shaft and an axial O-ring is positioned at the other end of the shaft.

Other attempts have been directed at shifting resonant frequencies. For example, in U.S. Pat. No. 5,625,511, the spindle motor shaft is formed with stepped surfaces to reduce disk drive acoustic noise by tuning the torsional frequency of the spindle motor shaft away from the driving frequency of the motor.

The above prior art is directed to solving the problems originating from only one type of vibration mode. However, other types of vibration modes may cause undesirable drive dynamics, e.g., track misregistration and vibro-acoustic disturbances. Elastic vibration of the mount flange and/or the baseplate in a disk drive can cause these types of undesirable drive dynamics.

Yet another problem involves the mounting of the spindle motor and the drive baseplate. Often there are deformities on the baseplate or the motor mount that can affect the stability of the baseplate/mount, which can thereby also contribute to undesirable drive dynamics.

It can be seen that there is a need for a method and apparatus that allows the optimization of the drive dynamics.

It can also be seen that there is a need for a mounting interface between the baseplate and the motor mount that stabilizes the baseplate/mount.

It can also be seen that there is a need for a method and apparatus for dissipating distortion energy emanating from the vibration modes for the disk drive motor.

SUMMARY OF THE INVENTION

To overcome the limitations in the prior art described above, and to overcome other limitations that will become apparent upon reading and understanding the present specification, the present invention discloses a mounting interface for a spindle motor.

The present invention solves the above-described problems by providing a method and apparatus that allows the optimization of the spindle dynamics. The mounting interface is disposed between the baseplate and the motor mount and stabilizes the baseplate/mount.

A system in accordance with the principles of the present invention includes a mounting interface for providing a steadfast relationship between a motor and a baseplate, wherein the mounting interface includes at least three surface points forming a single plane acting as a common boundary between the motor and the baseplate.

Other embodiments of a system in accordance with the principles of the invention may include alternative or optional additional aspects. One such aspect of the present invention is that the at least three surface points further includes pads.

Another aspect of the present invention is that the at least three surface points are coupled to the baseplate.

Another aspect of the present invention is that the motor includes a mount flange, wherein the at least three surface points are coupled to the mount flange.

Another aspect of the present invention is that the at least three surface points provide reduced contact area between the mount flange and the baseplate, the reduced contact area lowering the rigidity of the mount flange and the resonant frequencies.

Another aspect of the present invention is that the at least three surface points have a surface area, the surface area being chosen to reduce acoustical noise.

Another aspect of the present invention is that the at least three surface points are formed using a predetermined material, the predetermined material being chosen to reduce acoustical noise.

Another aspect of the present invention is that a damping ring is provided for dissipating distortion energy between the motor, baseplate and/or mount flange.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a mounting interface between a disk drive spindle motor and the drive baseplate which enables optimization of spindle dynamics. This is achieved by providing a means to shift resonant frequencies to a desired location and by providing a more repeatable boundary condition for the spindle motor. A damping ring may be used for dissipating distortion energy between the motor, baseplate and/or mount flange.

Figure 1:
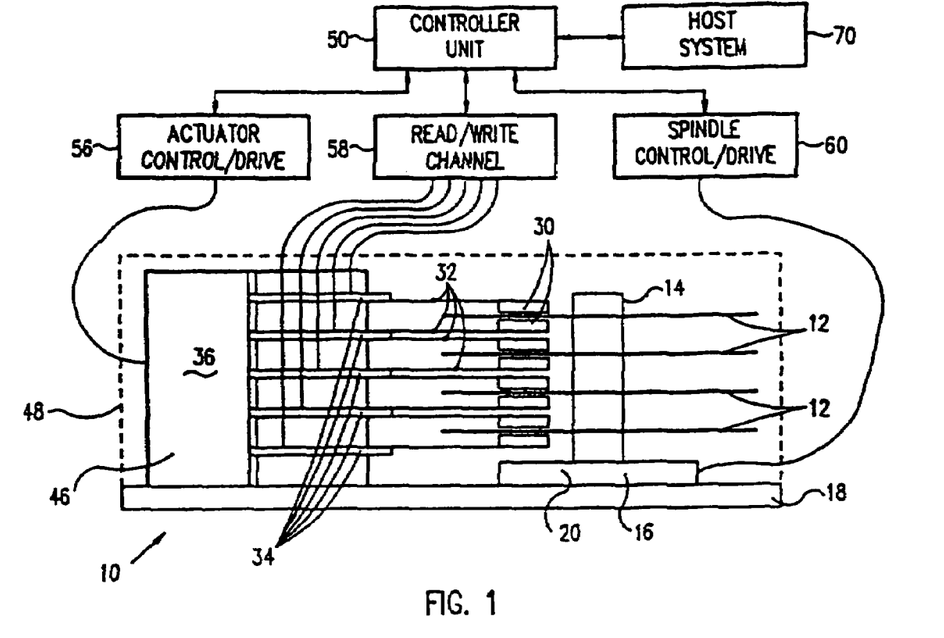
FIG. 1 shows a schematic diagram of a data storage system suitable for practicing the present invention.

FIG. 1 shows a schematic diagram of a data storage system 10 suitable for practicing the present invention. System 10 includes a plurality of magnetic recording disks 12. Each disk has a plurality of concentric data tracks. Disks 12 are mounted on a spindle motor shaft 14 which is connected to a spindle motor 16. Motor 16 is mounted to a chassis 18. The disks 12, spindle 14, and motor 16 include a disk stack assembly 20.

A plurality of sliders 30 having read/write heads are positioned over the disks 12 such that each surface of the disks 12 has a corresponding slider 30. Each slider 30 is attached to one of the plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically includes a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The sliders 30, suspensions 32, arms 34, and actuator 36 include an actuator assembly 46. The disk stack assembly 20 and the actuator assembly 46 are sealed in an enclosure 48 (shown by dashed line) which provides protection from particulate contamination.

A controller unit 50 provides overall control to system 10. Controller unit 50 typically contains a central a processing unit (CPU), memory unit and other digital circuitry. Controller 50 is connected to an actuator control/drive unit 56 which in turn is connected to actuator 36. This allows controller 50 to control the movement of sliders 30 over disks 12. The controller 50 is a connected to a read/write channel 58 which in turn is connected to the heads of the sliders 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request that digital data be read from disks 12 and sent to the system 70. The basic operation of DASD units is well known in the art and is described in more detail in Magnetic Recording Handbook, C. Dennis Mee and Eric D. Daniel, McGraw Hill Book Company, 1990.

Figure 2:
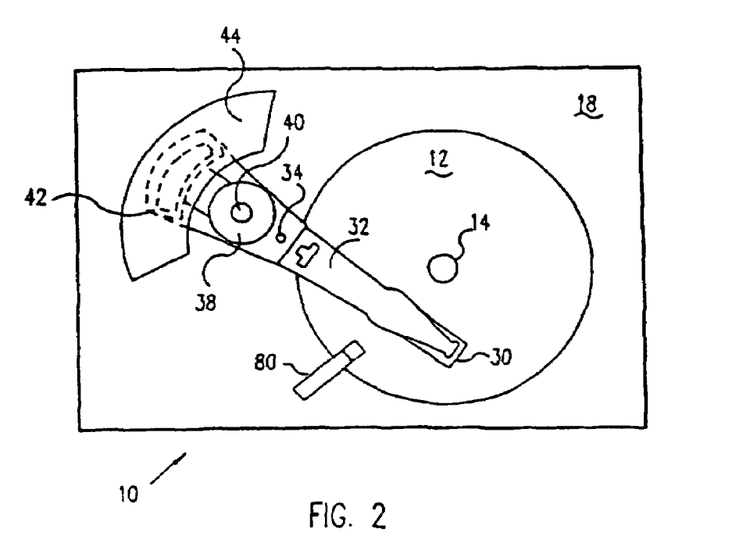
FIG. 2 shows top view of system of FIG. 1.

FIG. 2 shows a top view of system 10. A loading ramp member 80 is located at the edge of the disk stack assembly 20. Member 80 automatically unloads the sliders 30 from the disks 12 as actuator 36 moves the sliders 30 to the outer disk position. To unload a slider or head means to move it a vertical distance away from its corresponding disk surface. The ramp 80 is optional. Alternatively, the sliders 30 may be placed permanently in the loaded position between the disks.

Figure 3:
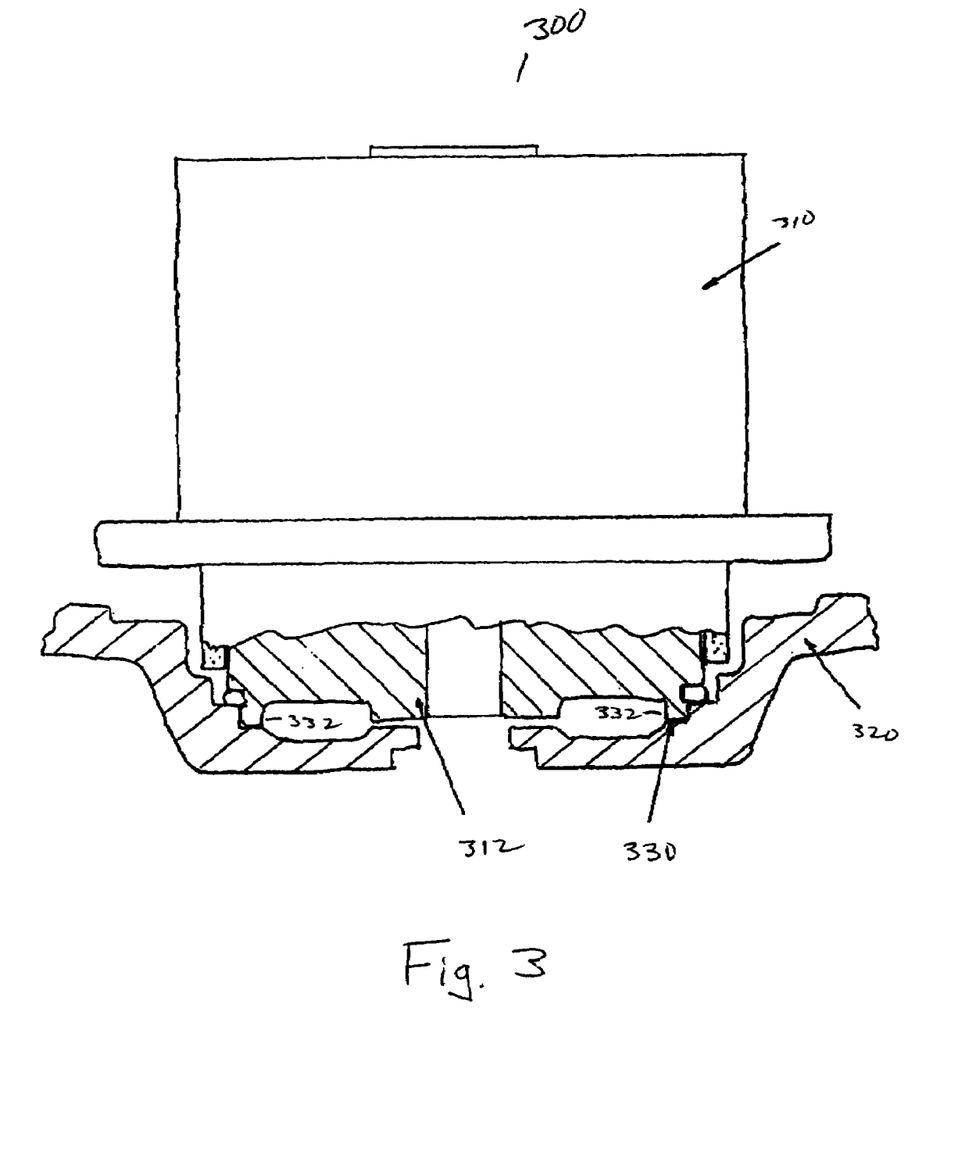
FIG. 3 illustrates the spindle motor sitting in the baseplate.

FIG. 3 illustrates the spindle motor sitting in the baseplate 300. In FIG. 3, the motor 310 includes a mount flange 312 for interfacing with the baseplate 320. A mounting interface 330 is provided between the baseplate 320 and the motor mount flange 312 for stabilizing the baseplate/mount. As shown in FIG. 3, the mounting interface 330 includes mount pads 332 that are coupled or made integral with the mount flange 312. Those skilled in the art will recognize that the mounting interface 330 may instead be coupled or made integral with the baseplate 320. Hereinafter, the term "coupled" as used with respect to the mounting interface 330 to the mount flange 312 or to the baseplate 320 will be understood to refer generically to both a joining together of the mount interface 330 to the mount flange 312 or to the baseplate 320, or to the mounting interface 330 being formed as a constituent portion of the baseplate 320 or mount flange 312.

Geometrically, three points define a plane. In the case of the mount interface 330, any surface off of the plane, i.e., due to manufacturing tolerances, will result in a variation of the interface condition which could affect the dynamic performance of the spindle. The mounting interface 330 therefore provides a stable mount between the mount flange 312 and the baseplate 320. Further, although the mounting interface 330 in FIG. 3 is illustrated as being a pad 332, those skilled in the art will recognize from the above discussion that the mounting interface 330 may include any structure providing three surface points defining a plane.

Figure 4:
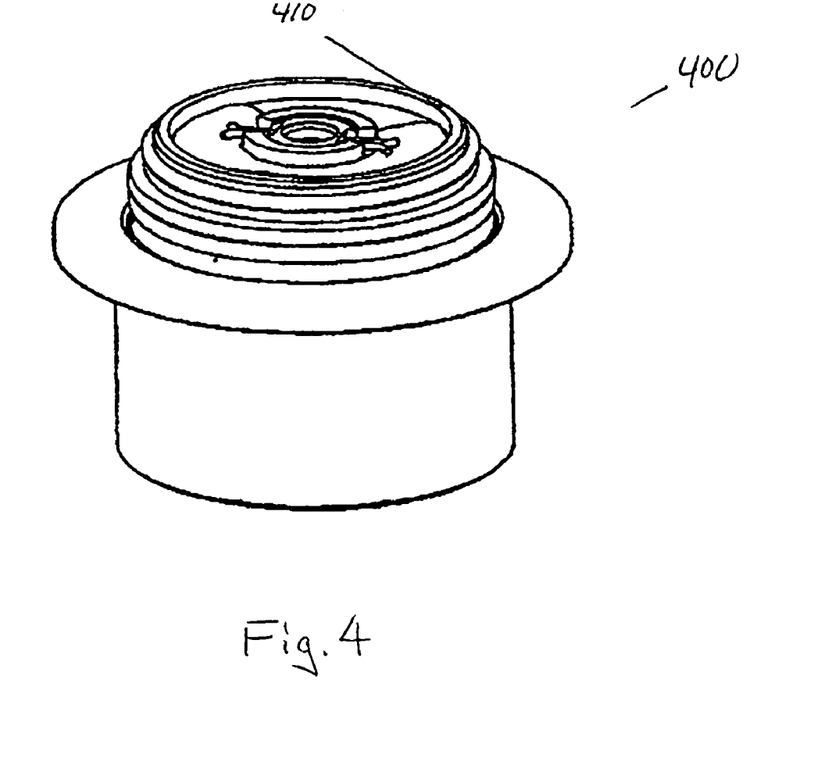
FIG. 4 a mount flange according to the prior art.

FIG. 4 illustrates a mount flange 400 according to the prior art. The mount flange 400 of FIG. 4 engages the baseplate so that the mount flange 400 contacts the baseplate over a 360 degree annular surface. Thus, any contaminant bump or flatness problem on the baseplate or motor mount flange 400 surface affects the interface condition at the mount surface 410 when a mount flange 400 contacts the surface area of the baseplate.

Figure 5:
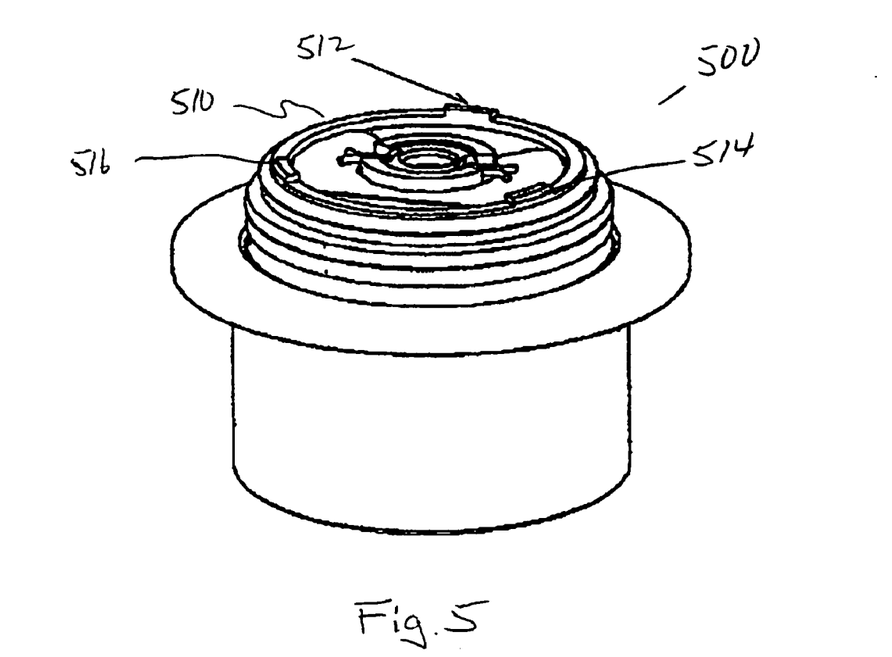
FIG. 5 illustrates a mount flange that includes the mounting interface according to the present invention.

FIG. 5 illustrates a mount flange 500 that includes the mounting interface 510 according to the present invention. As illustrated in FIG. 5, the mounting interface 510 includes three mount pads 512, 514, 516 that provide the interface to the drive baseplate. The reduced interface contact area provided by the three pads 512, 514, 516 changes the spindle motor boundary conditions to lower the dynamic rigidity of the mount flange 500. This results in lower resonant frequencies for troublesome vibration modes. By shifting the resonant frequency in this manner, interaction between resonant frequency and excitation frequency of the motor can be avoided to improve acoustics and track follow performance. The three mount pads 512, 514, 516 provide a frequency reduction of approximately 80 Hz. However, those skilled in the art will recognize that the invention is not meant to be limited to the particular embodiment shown in FIG. 5, but that the size of the mount pads 512, 514, 516 and the material selected for the mount pads 512, 514, 516 are parameters that allow optimization of the desired frequency shift.

In addition, the three mount pads 512, 514, 516 provide a more consistent mount interface. As discussed above, any contaminant bump or flatness problem on the baseplate or motor mount surface affects the interface condition when a mount flange 500 contacts the baseplate over a large surface area 410. For example, the spindle design 400 shown in FIG. 4 may contact the baseplate over a 360 degree annular surface. However, the three pads 512, 514, 516 of the mount flange 500 shown in FIG. 5 significantly reduces the likelihood of this problem.

Figure 6:
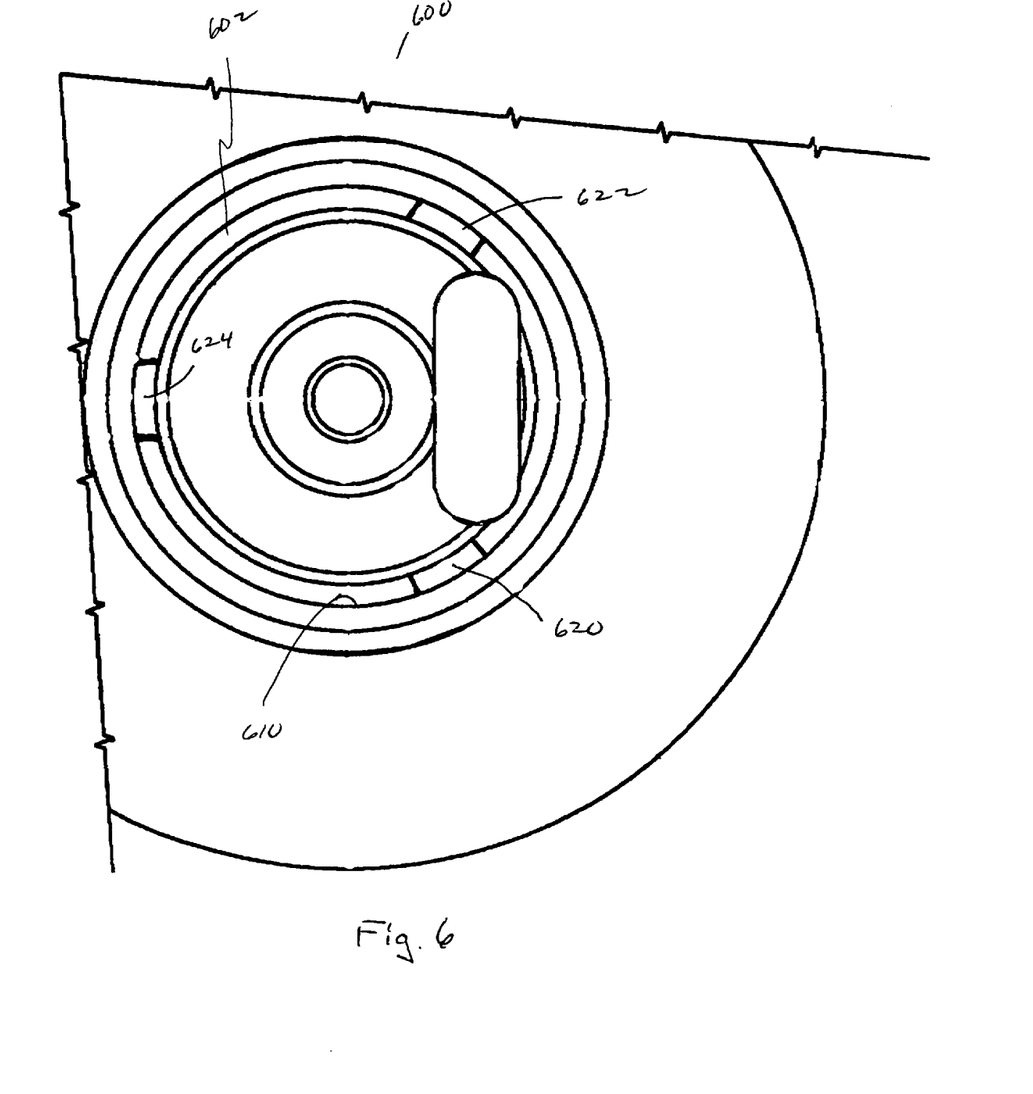
FIG. 6 illustrates a view looking down at a portion the baseplate having a mounting interface according to the present invention.

FIG. 6 illustrates a view looking down at a portion the baseplate 600 having a mounting interface 602 according to the present invention. In FIG. 6, the baseplate 600 has an angular ring 610 where the motor mount flange (not shown) may be seated. The mounting interface of FIG. 6 includes three pads 620, 622, 624 that are coupled or made integral with the baseplate 600. Again, the reduced interface contact area provided by the three pads 620, 622, 624 changes the spindle motor boundary conditions to lower the dynamic rigidity of the mount flange. This results in lower resonant frequencies for troublesome vibration modes. However, those skilled in the art will recognize that the mounting interface 602 may include any structure providing three points defining a plane as described above.

Figure 7:
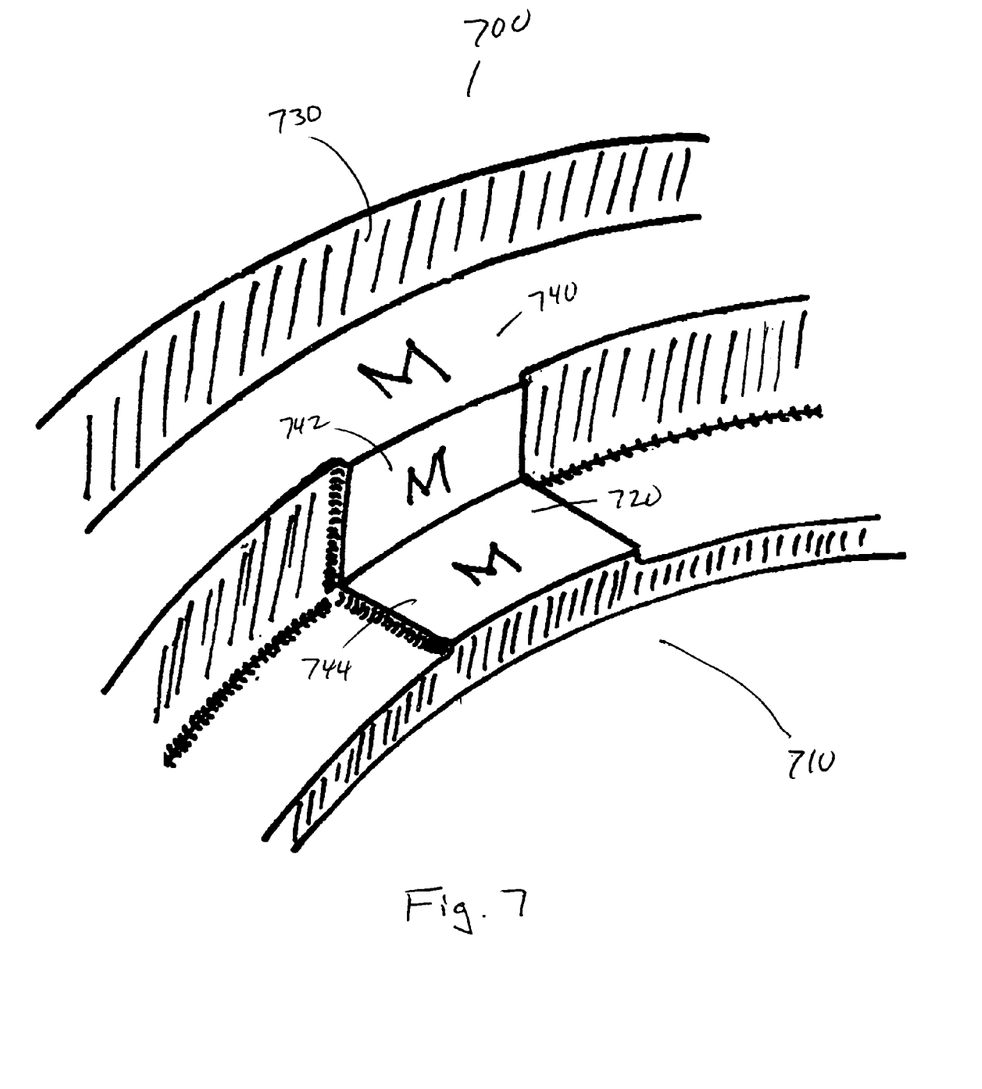
FIG. 7 illustrates one embodiment of the mounting interface wherein the mounting interface includes a mount pad formed integral with the baseplate.

FIG. 7 illustrates one embodiment 700 of the mounting interface 710 wherein the mounting interface 710 includes a mount pad 720 formed integral with the baseplate 730. The baseplate 730 is cast according to a predetermined design specification, and then the pad 720 is formed by machining three surfaces 740, 742, 744 of the baseplate 700. The pad 720 is formed with a generally rectangular shape. However, those skilled in the art will recognize that the invention is not meant to be limited to the geometry illustrated in FIG. 7, but that other pad geometries are possible within the scope of the present invention.

Figure 8:
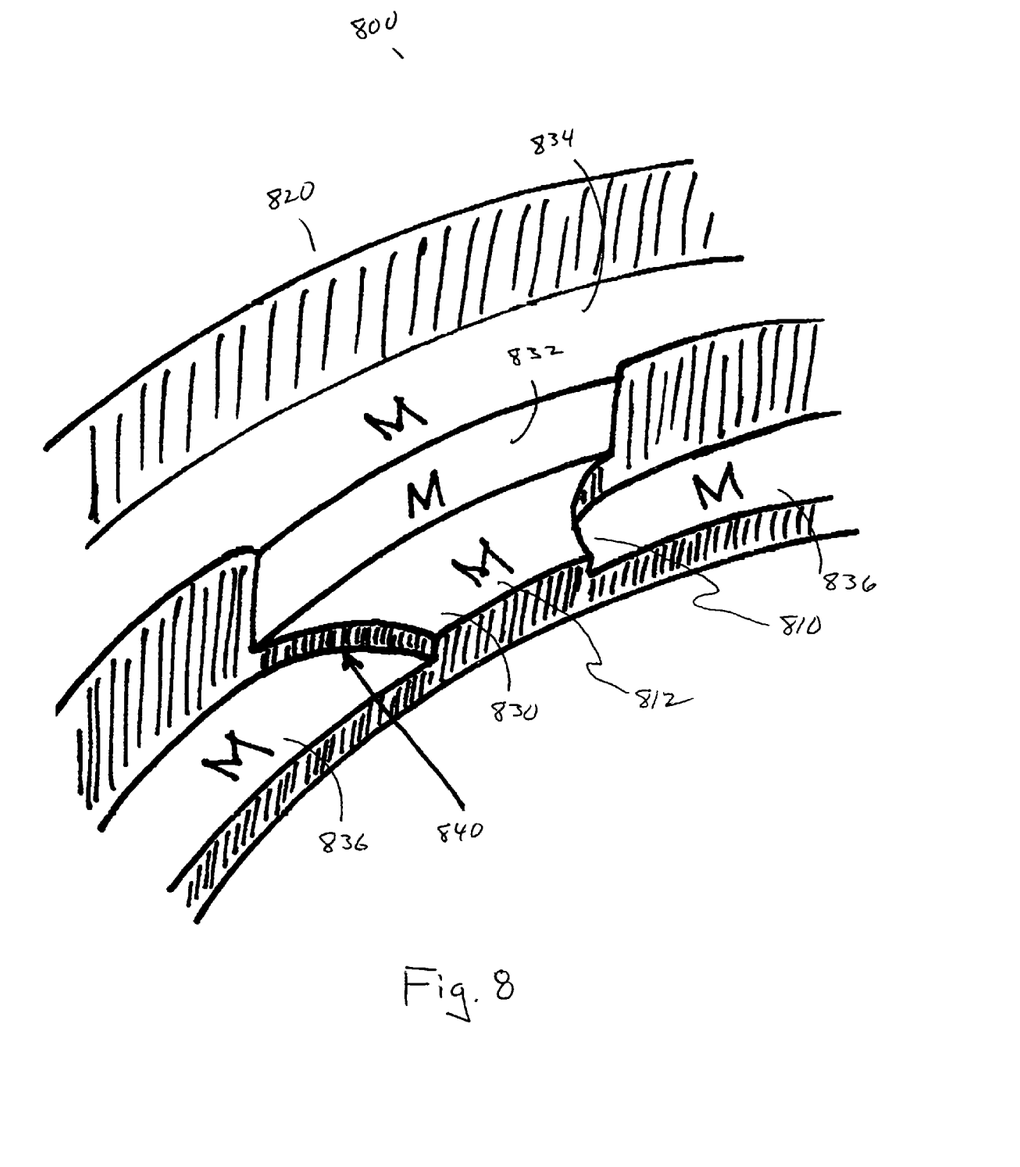
FIG. 8 illustrates an alternative embodiment of the mounting interface wherein the mounting interface includes a mount pad formed integral with the baseplate.

FIG. 8 illustrates an alternative embodiment 800 of the mounting interface 810 wherein the mounting interface 810 includes a mount pad 812 formed integral with the baseplate 820. The baseplate 820 is cast according to a predetermined design specification, and then the pad 812 is formed by machining surfaces 830, 832, 834, 836 of the baseplate. In FIG. 8, the surface 836 adjacent the pad is also machined to form a pad having a curved surface 840. However, those skilled in the art will recognize that the invention is not meant to be limited to the geometry illustrated in FIG. 8, but that other pad geometries are possible within the scope of the present invention.

In addition to providing a reduced surface area for lowering the resonant frequency associated with disk drive, a damping ring may be provided to dissipate distortion energy. For certain troublesome vibration modes of the spindle motor, elastic deformation of the mount flange may occur that entails transverse bending of the mount flange between any two of the three pads. The damping ring acts as a constrained layer damper by being sandwiched between the baseplate and the motor mount flange. Accordingly, the amplitude of vibration will be reduced to cause lower acoustic output of the disk drive. FIGS. 9–14 illustrate different embodiments of the damping ring according to the present invention. However, those skilled in the art will recognize that the invention is not meant to be limited to these illustrated embodiments, but rather other damping ring embodiments are possible within the scope of the present invention.

Figure 9:
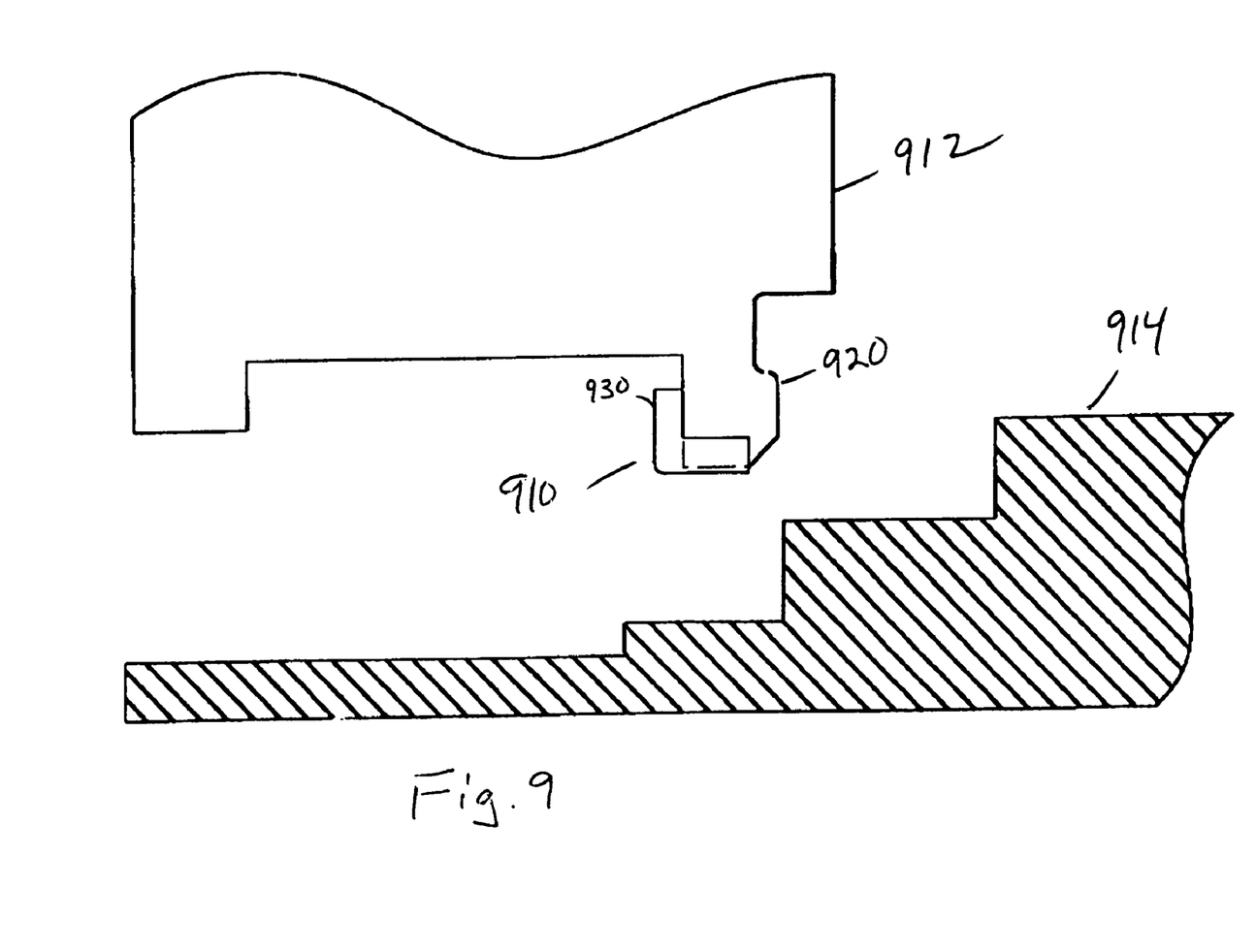
FIG. 9 illustrates a damping ring coupled to the mount flange according to the present invention.

FIG. 9 illustrates a damping ring 910 coupled to the mount flange 912 according to the present invention. In FIG. 9, a partial cross-section of the mount flange 912 and the baseplate 914 are shown. The mount flange 912 is shown having a mount pad 920 according to the present invention. The damping ring 910 is provided to dissipate distortion energy caused by the vibration of the mount flange 912. The damping ring 910 includes a notch (not shown) wherein the mount pad 920 is disposed. Accordingly, the damping ring 910 surrounds the mount pad 920 on three sides. An inner, vertical portion 930 of the damping ring 910 rests against the back of the mount pad 920. The damping ring 910 actually extends slightly below the plane of the bottom of the mount pad 920 so that the damping ring 910 contacts the baseplate 914 and is slightly compressed when the motor is installed. However, the damping ring 910 does not reside between the mount pad 920 and the baseplate 914. Thus, the geometric location and stability of the motor and mount flange 912 is not affected by the damping ring, i.e., there is still solid metal-to-metal contact between the motor/mount flange 912 and the baseplate 914. Those skilled in the art will recognize that the damping ring 910 may be formed in a single ring with cutouts for the mount pads 920.

Figure 10:
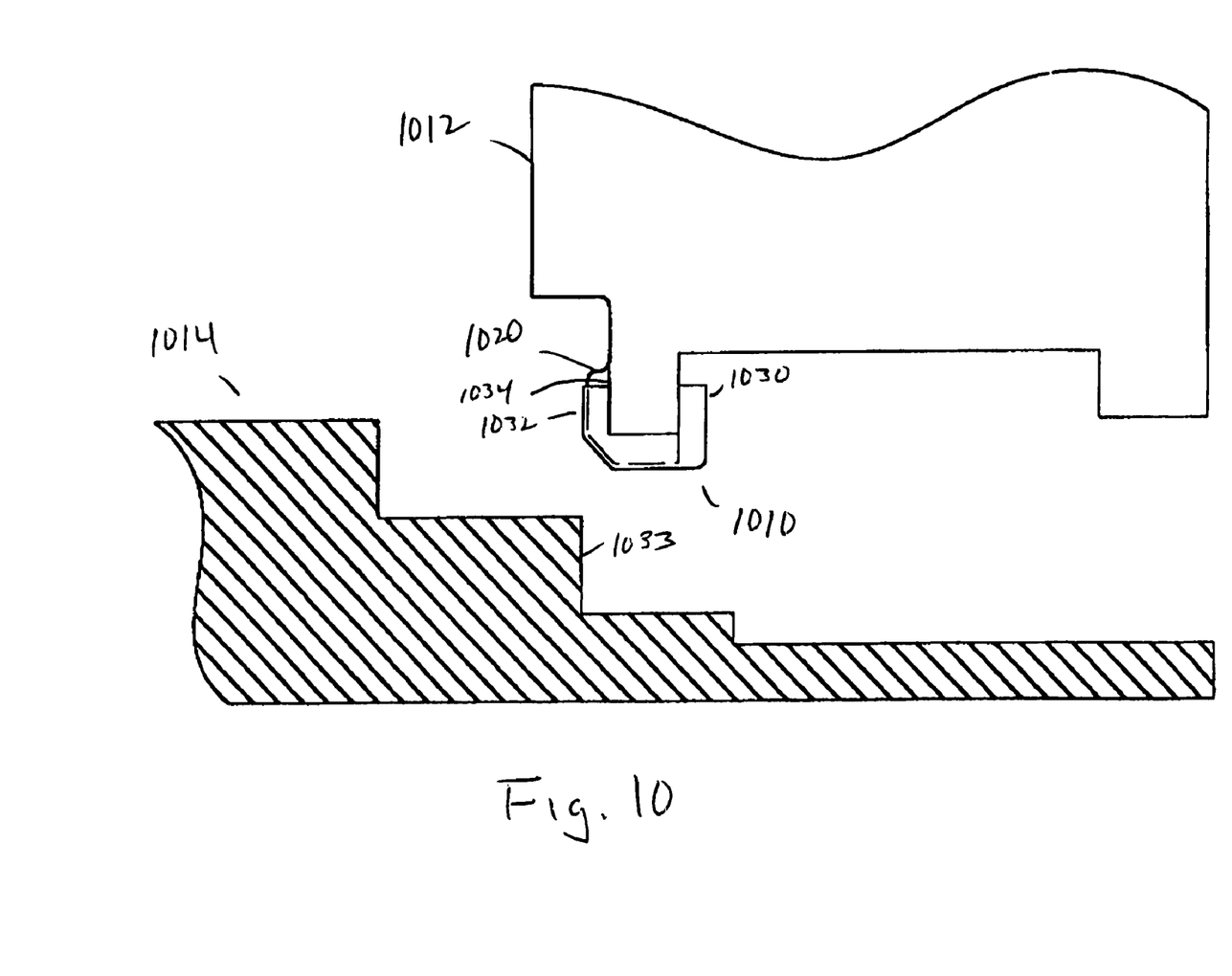
FIG. 10 illustrates a second embodiment of a damping ring coupled to a mount flange according to the present invention.

FIG. 10 illustrates a second embodiment of a damping ring 1010 coupled to a mount flange 1012 according to the present invention. In FIG. 10, a partial cross-section of the mount flange 1012 and the baseplate 1014 are again shown with the mount flange 1012 having a mount pad 1020. The damping ring 1010 is provided to dissipate distortion energy caused by the vibration of the mount flange 1012. The damping ring 1010 includes a notch (not shown) wherein the mount pad 1020 is disposed therebetween. Accordingly, the damping ring 1010 surrounds the mount pad 1020 on three sides. An inner, vertical portion 1030 of the damping ring 1010 rests against the back of the mount pad 102. In addition, an outer, vertical portion 1032 is provided for engaging with the side wall 1033 of the baseplate 1014. The outer, vertical portion 1032 dissipates energy resulting from sheer distortion between the baseplate 1014 and the mount flange 1012. The outside diameter of the mount flange 1012 is recessed radially 1034 to allow room for the damping ring 1010, but the recessed portion 1034 does not extend into the region of the mount pads 1020. Thus, the mount pads 1020 still locate the motor in the horizontal (x-y) plane as well as vertical direction. Preferably the damping ring 1010 is a relatively soft, elastomeric material, therefore it can be slightly compressed into the bore of the baseplate 1014 when installed. However, those skilled in the art will recognize that other types of soft or compressible may be used without departing from the scope of the present invention.

Figure 11:
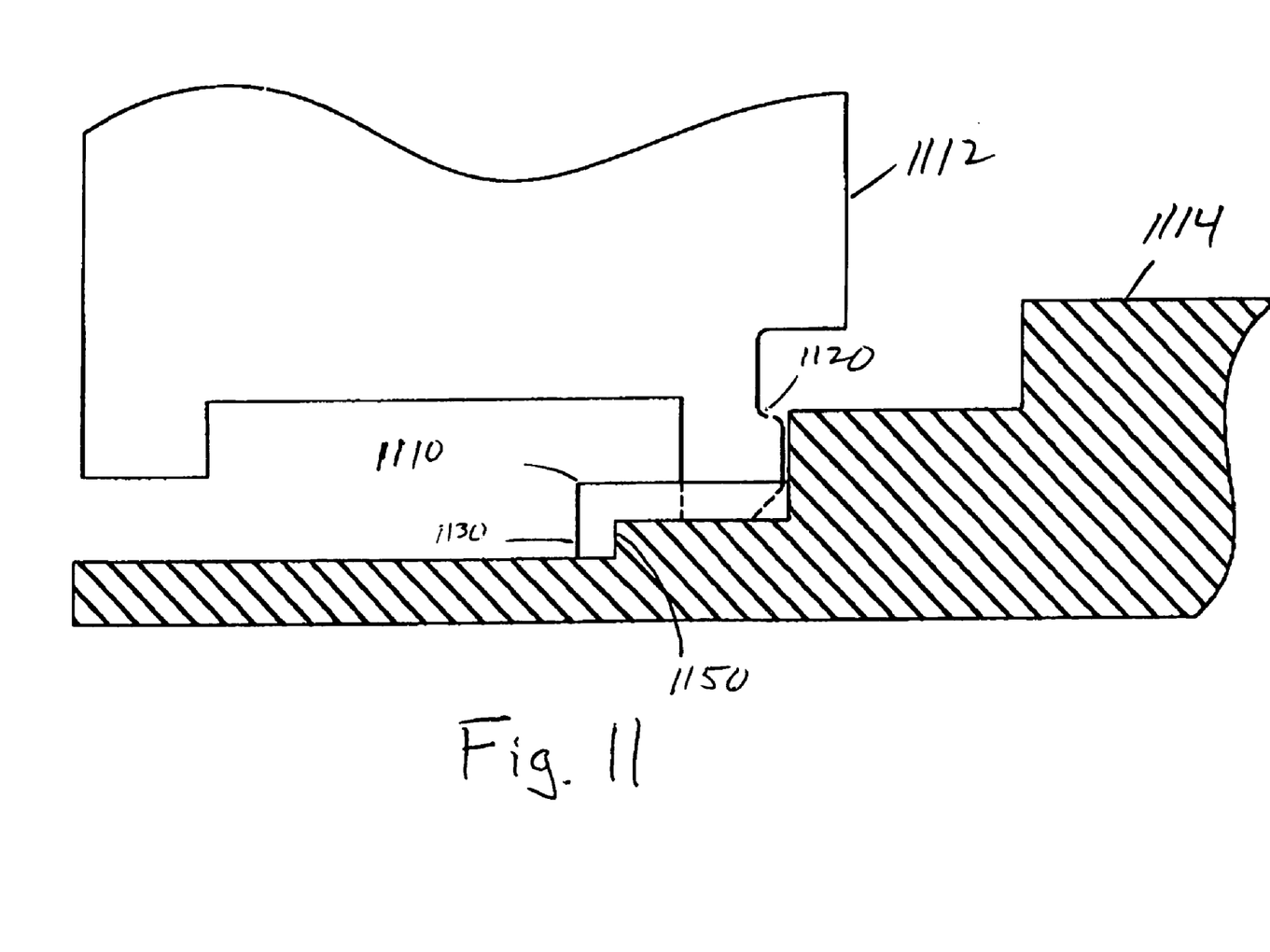
FIG. 11 illustrates a third embodiment of a damping ring coupled to the baseplate according to the present invention.

FIG. 11 illustrates a third embodiment of a damping ring 1110 coupled to the baseplate 1114 according to the present invention. In FIG. 11, a partial cross-section of the mount flange 1112 and the baseplate 1114 are shown. The mount flange 1112 is shown having a mount pad 1120. The damping ring 1110 is coupled to the baseplate 1114 to dissipate distortion energy caused by the vibration of the mount flange 1112 therewith. The damping ring 1110 includes a notch (not shown) wherein the mount pad 1120 is disposed. Accordingly, the damping ring 1110 surrounds the mount pad 1120 on three sides. An inner, vertical portion 1130 of the damping ring 1110 rests against the lip 1150 of the baseplate 1114.

Figure 12:
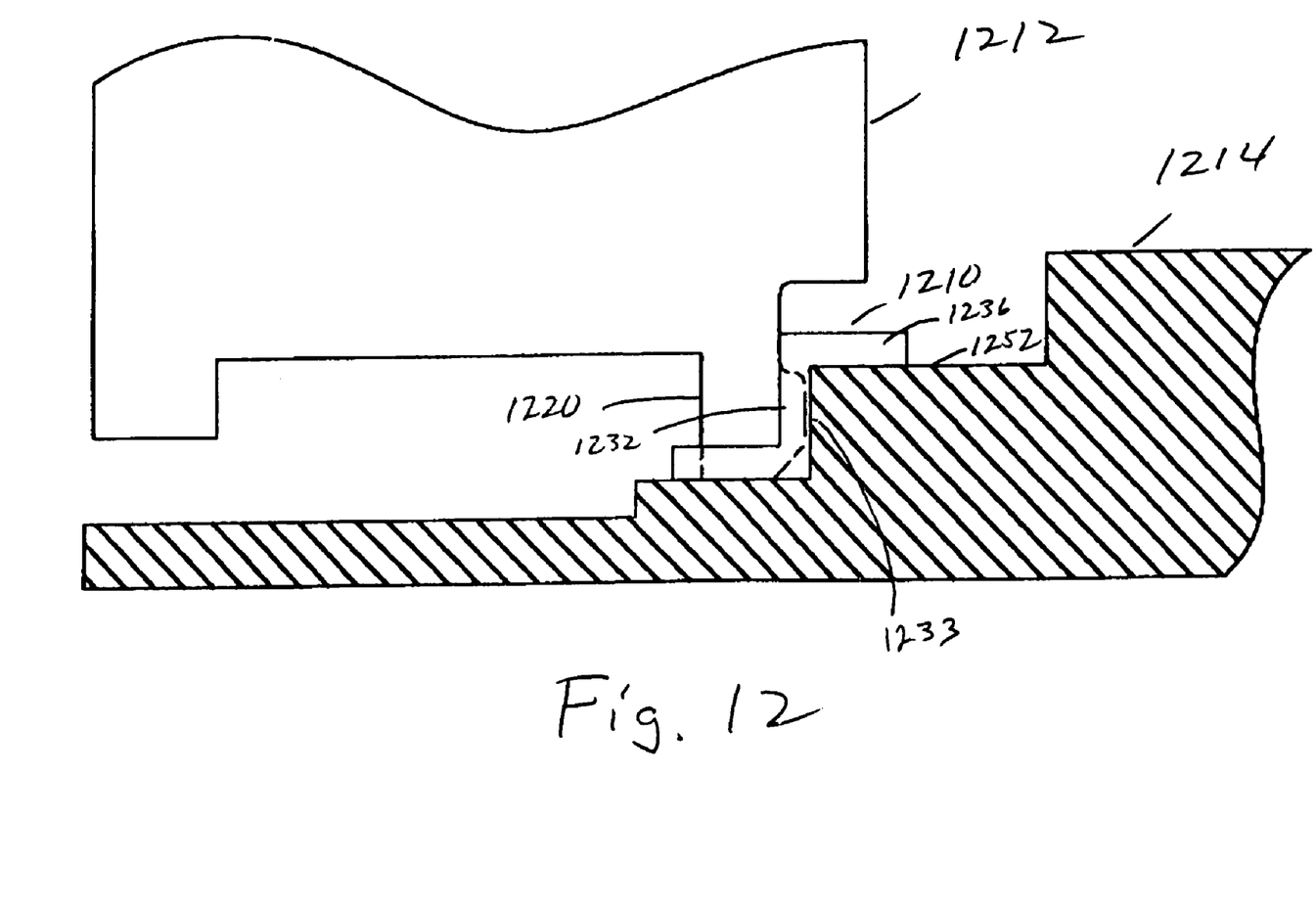
FIG. 12 illustrates a fourth embodiment of a damping ring coupled to the baseplate according to the present invention.

FIG. 12 illustrates a fourth embodiment of a damping ring 1210 coupled to the baseplate 1214 according to the present invention. In FIG. 12, a partial cross-section of the mount flange 1212 and the baseplate 1214 are shown. The mount flange 1212 is shown having a mount pad 1220. The damping ring 1210 is coupled to the baseplate 1214 to dissipate distortion energy caused by the vibration of the mount flange 1212 therewith. The damping ring 1210 includes a notch (not shown) wherein the mount pad 1220 is disposed and the damping ring 1210 surrounds the mount pad 1220 on three sides. An outer, vertical portion 1232 of the damping ring 1210 rests against a face 1233 of the baseplate and a lateral portion 1236 extends over a top surface 1252 of the baseplate 1214. The outer, vertical portion 1232 dissipates energy resulting from sheer distortion between the baseplate 1214 and the mount flange 1212.

Figure 13:
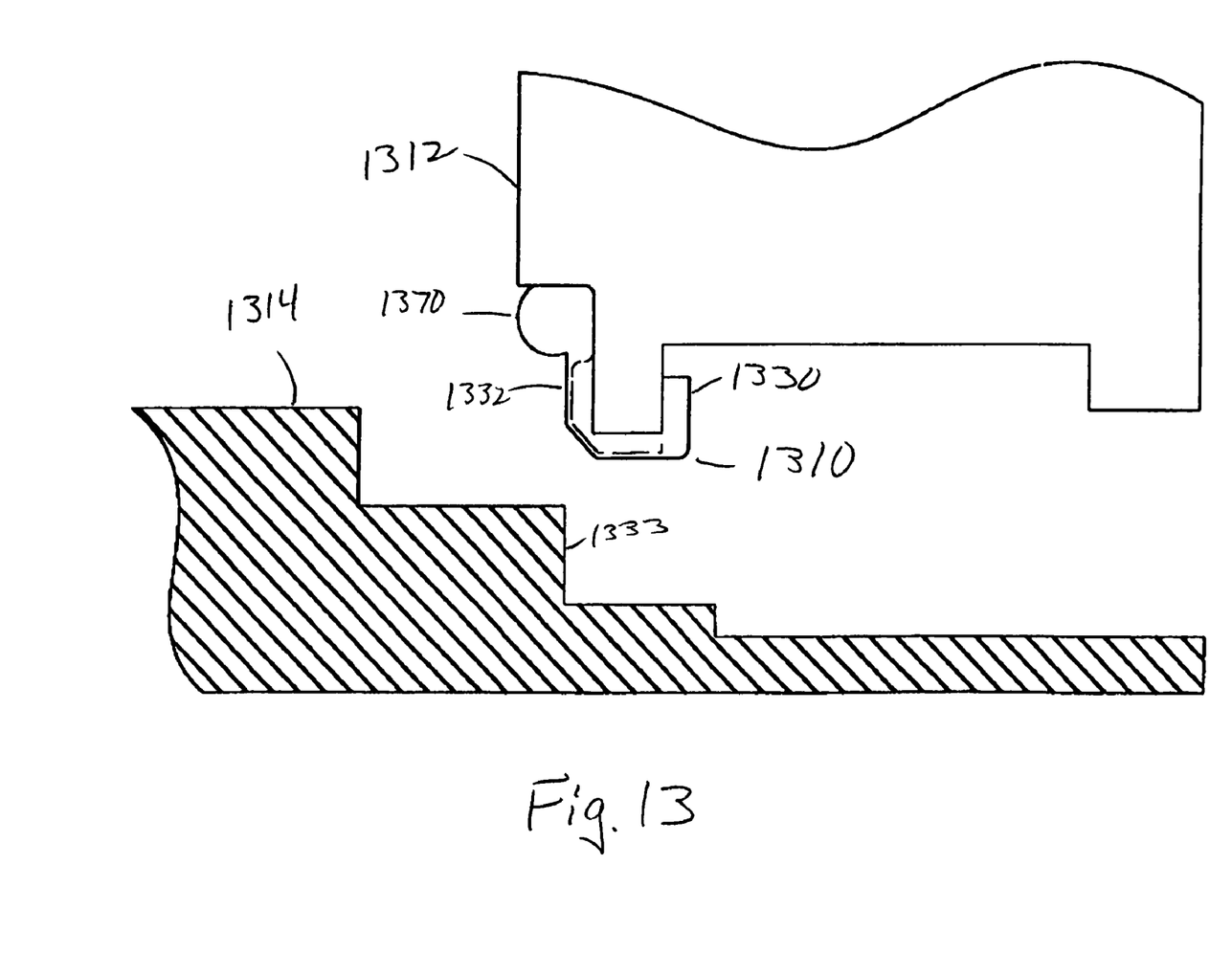
FIG. 13 illustrates a fifth embodiment of a damping ring coupled to the mount flange according to the present invention.

FIG. 13 illustrates a fifth embodiment of a damping ring 1310 coupled to the mount flange 1312 according to the present invention. In FIG. 13, the damping ring 1310 includes an outer, vertical portion 1332 that rests against a face 1333 of the baseplate 1314 for dissipating energy resulting from sheer distortion between the baseplate 1314 and the mount flange 1312. At a position where the mount flange 1312 overhangs the baseplate 1314, the damping ring 1310 includes a seal 1370 for acting as a barrier between the baseplate 1314 and the mount flange 1312 to prevent outside contamination from entering the disk enclosure.

Figure 14:
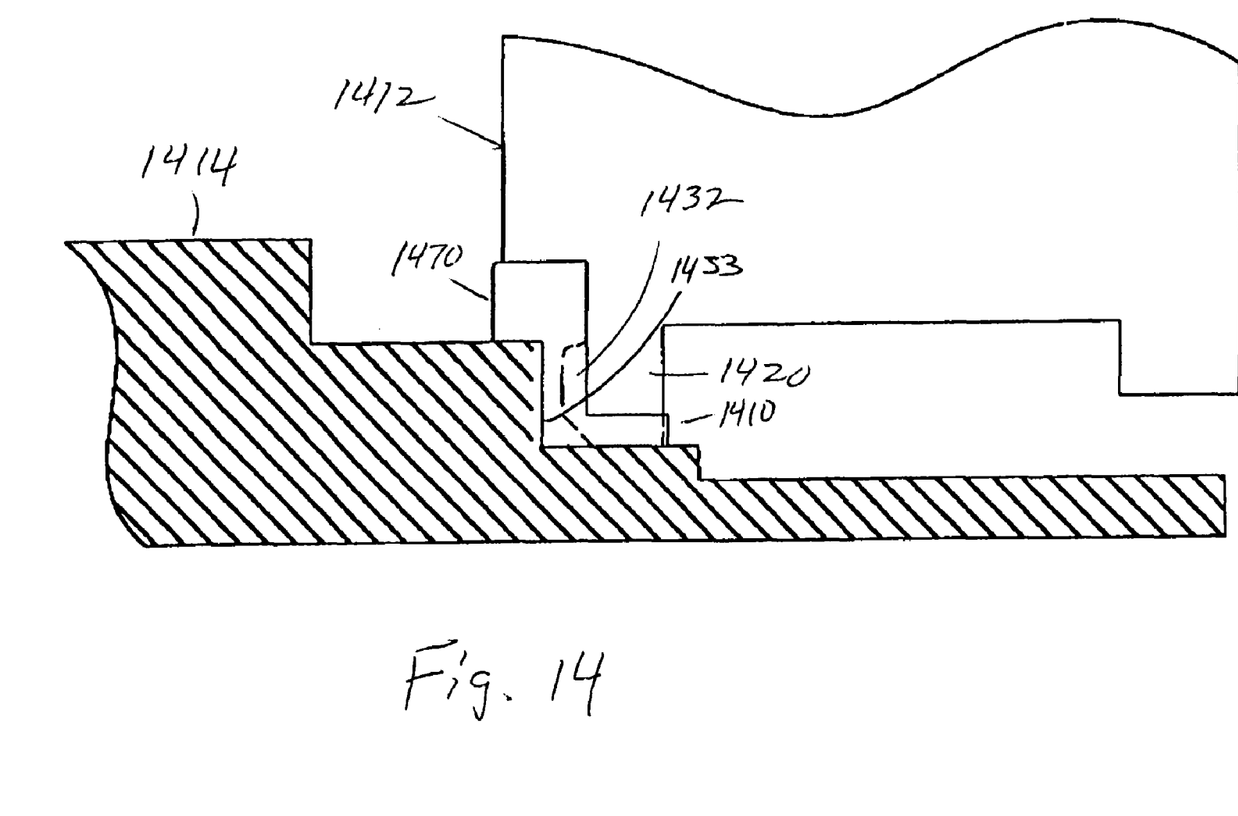
FIG. 14 illustrates a sixth embodiment of a damping ring coupled to the baseplate according to the present invention.

FIG. 14 illustrates a sixth embodiment of a damping ring 1410 coupled to the baseplate 1414 according to the present invention. In FIG. 14, the damping ring 1410 includes an outer, vertical portion 1432 that rests against a face 1433 of the baseplate 1414 for dissipating energy resulting from sheer distortion between the baseplate 1414 and the mount flange 1412. At a position where the mount flange 1412 overhangs the baseplate 1414, the damping ring 1410 includes a seal 1470 for providing a seal between the baseplate 1414 and the mount flange 1412 to prevent outside contamination from entering the disk enclosure.

In summary, the present invention provides a mounting interface between the baseplate and the motor mount for stabilizing the baseplate/mount. The mounting interface includes mount pads that are coupled or made integral with the mount flange or the baseplate. The mounting interface provides a stable mount between the mount flange and the baseplate by providing three points defining a plane that is generally parallel to the plane of the mount flange and/or the baseplate. A damping ring may be used for dissipating distortion energy between the motor, baseplate and/or mount flange.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A mounting interface for providing a steadfast relationship between a motor operated at a drive frequency and a baseplate, the mounting interface comprising three surface points having an angular distribution therebetween and providing a minimum planar surface acting as a common boundary between the motor and the baseplate, wherein the angular distribution, size, shape and material of the three surface points affect a vibration mode at a resonant frequency, and wherein at least one of the angular distribution, size, shape and material of the three surface points is configured to shift the resonant frequency away from the drive frequency to minimize vibration.

2. The mounting interface of claim 1, wherein the at least three surface points are coupled to the baseplate.

3. The mounting interface of claim 1, wherein the motor includes a mount flange, wherein the at least three surface points are coupled to the mount flange.

4. The mounting interface of claim 1, wherein the motor includes a mount flange and wherein the at least three surface points provide minimum contact between the mount flange and the baseplate, a configuration of the minimum contact area selected to lower a rigidity of the mount flange and resonant frequencies.

5. The mounting interface of claim 1, wherein the at least three surface points have a surface area, the surface area being chosen to reduce acoustical noise.

6. The mounting interface of claim 1, wherein the at least three surface points are formed using a predetermined material, the predetermined material being chosen to reduce acoustical noise.

7. The mounting interface of claim 1, wherein the at least three surface points are positioned at predetermined radial angles therebetween, the predetermined radial angles being chosen to reduce acoustical noise.

8. A data storage system, comprising:
a storage medium;
an actuator including a transducer disposed at a distal end of an actuator arm;
an actuator motor, coupled to the actuator, for moving the transducer relative to the storage medium;
a baseplate;
a spindle motor for rotating the storage medium;
a mount flange, coupled to the spindle motor, for coupling the spindle motor to the baseplate; and
a mounting interface disposed between the mount flange and the baseplate, the mounting interface providing a steadfast relationship between the spindle motor operated at a drive frequency and the baseplate, the mounting interface comprising three surface points having an angular distribution therebetween and providing a minimum planar surface acting as a common boundary between the motor and the baseplate, wherein the angular distribution, size, shape and material of the three surface points affect a vibration mode at a resonant frequency, and wherein at least one of the angular distribution, size, shape and material of the three surface points is configured to shift the resonant frequency away from the drive frequency to minimize vibration.

9. The data storage system of claim 8, wherein the at least three surface points are coupled to the baseplate.

10. The data storage system of claim 8, wherein the motor includes a mount flange, wherein the at least three surface points are coupled to the mount flange.

11. The data storage system of claim 8, wherein the motor includes a mount flange and wherein the at least three surface points provide minimum contact between the mount flange and the baseplate, a configuration of the minimum contact area selected to lower a rigidity of the mount flange and resonant frequencies.

12. The data storage system of claim 8, wherein the at least three surface points have a surface area, the surface area being chosen to reduce acoustical noise.

13. The data storage system of claim 8, wherein the at least three surface points are formed using a predetermined material, the predetermined material being chosen to reduce acoustical noise.

14. The data storage system of claim 8, wherein the at least three surface points are positioned at predetermined radial angles therebetween, the predetermined radial angles being chosen to reduce acoustical noise.

15. A method for reducing acoustic dynamics of a spindle motor, comprising:
providing a motor operated at a drive frequency;
providing a baseplate;
forming a mounting interface for providing a minimum planar surface acting as a common boundary between the motor and the baseplate and having three surface points having an angular distribution therebetween, wherein the angular distribution, size, shape and material of the three surface points affect a vibration mode at a resonant frequency; and
configuring at least one of the angular distribution, size, shape and material of the three surface points to shift the resonant frequency away from the drive frequency to minimize vibration.

16. The method of claim 15, wherein the forming a mounting interface further comprises forming the mounting interface on the baseplate.

17. The method of claim 15, wherein the forming a mounting interface further comprises forming the mounting interface on a mount flange and coupling the mount flange to the spindle motor.

18. The method of claim 15, wherein the forming a mounting interface further comprises reducing the contact area between a mount flange of the spindle motor and the baseplate to reduced contact area and lower the resonant frequencies.

19. The method of claim 15, wherein the forming a mounting interface further comprises forming at least three surface points having a surface area chosen to reduce acoustical noise.

20. The method of claim 15, wherein the forming a mounting interface further comprises forming at least three surface points using a predetermined material chosen to reduce acoustical noise.

21. The method of claim 15, wherein the forming a mounting interface further comprises forming at least three surface points with a predetermined radial angle between each of the at least three surface points, the predetermined radial angles being chosen to reduce acoustical noise.

* * * * *